E. G. GOBEN.
CUTTING MACHINE FOR CLOTH AND OTHER MATERIAL.
APPLICATION FILED DEC. 8, 1919.
1,380,710.
Patented June 7, 1921.
3 SHEETS—SHEET 2.
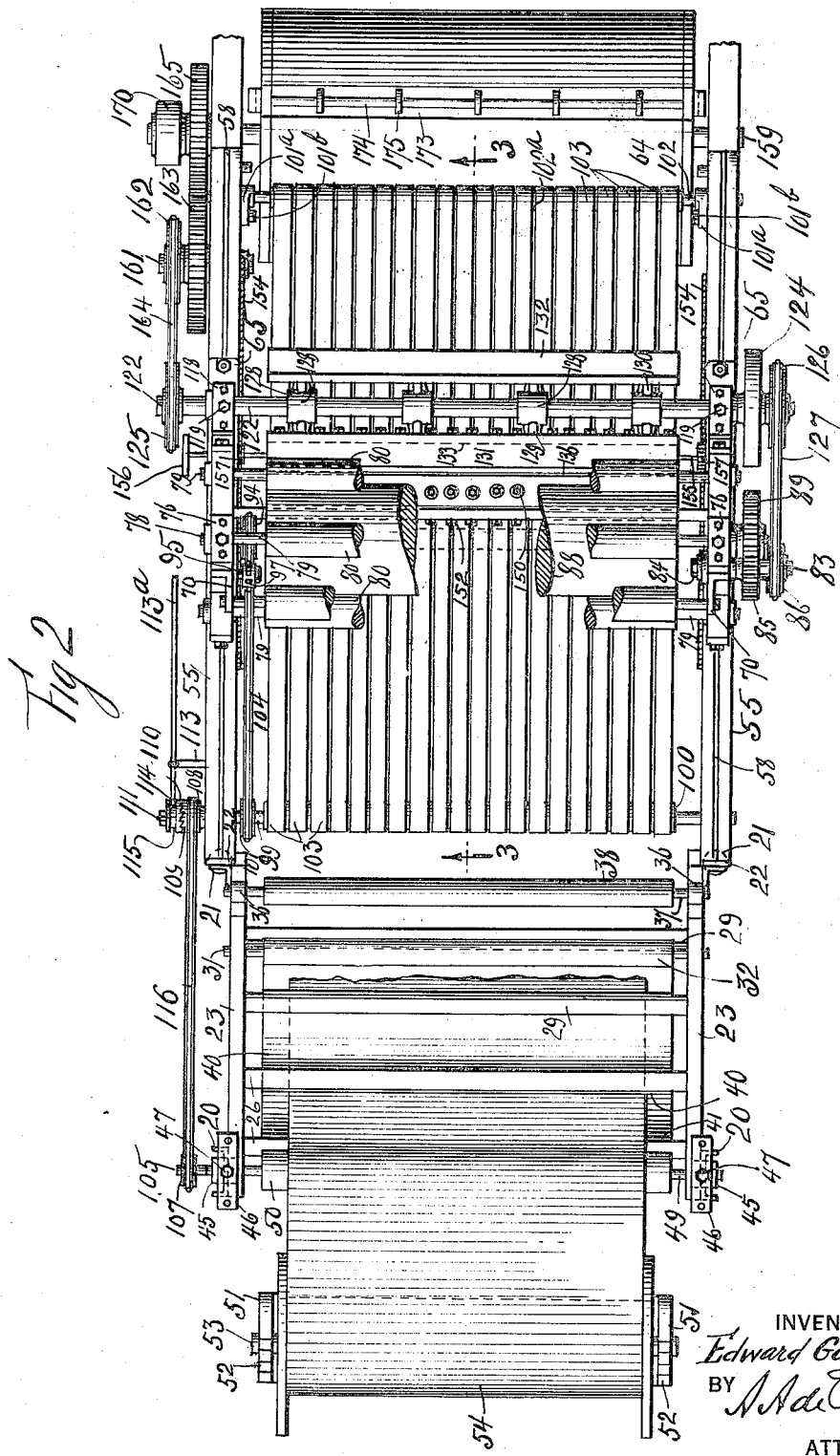
INVENTOR
Edward Guy Goben
BY
N A de Romeville
ATTORNEY

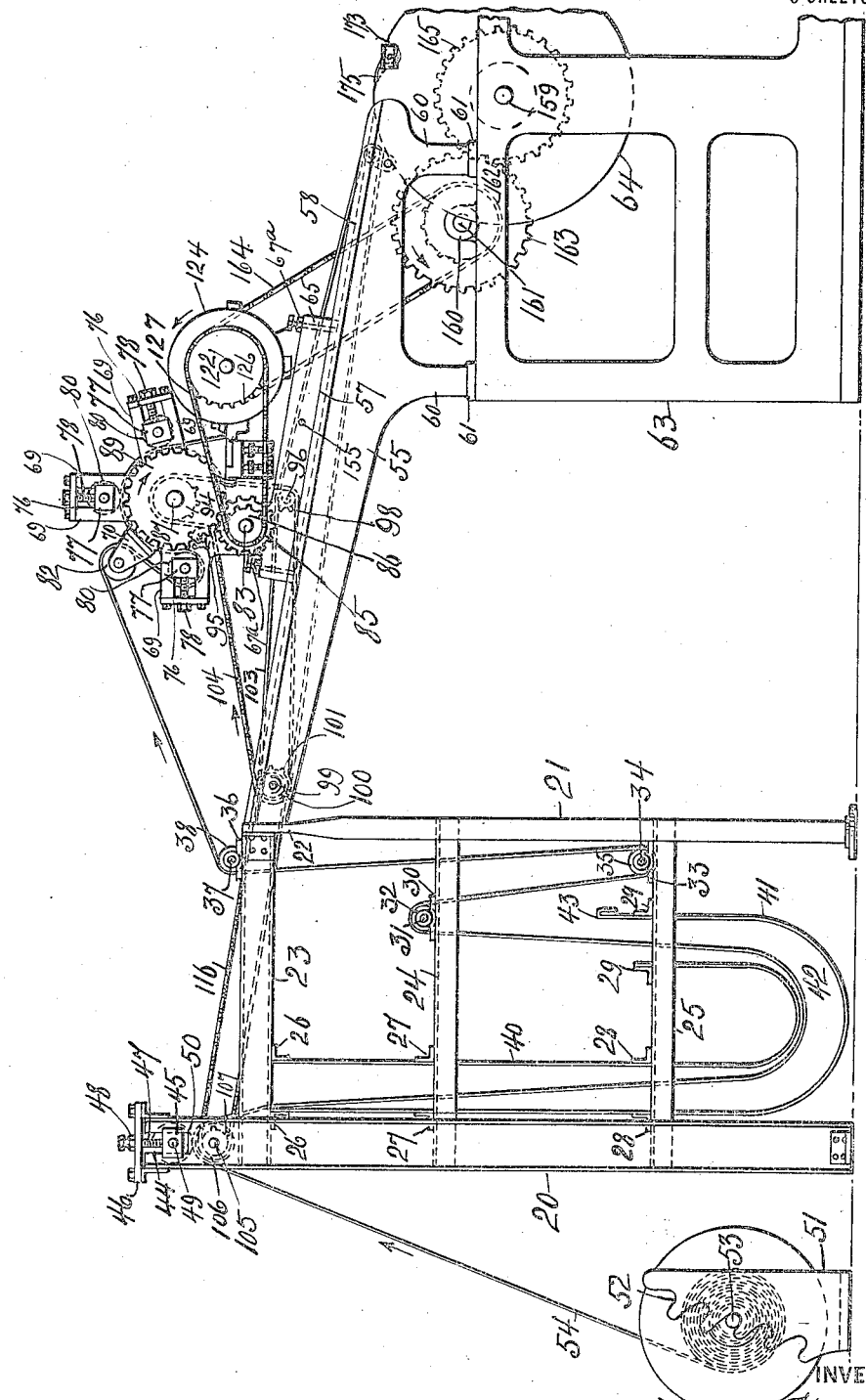

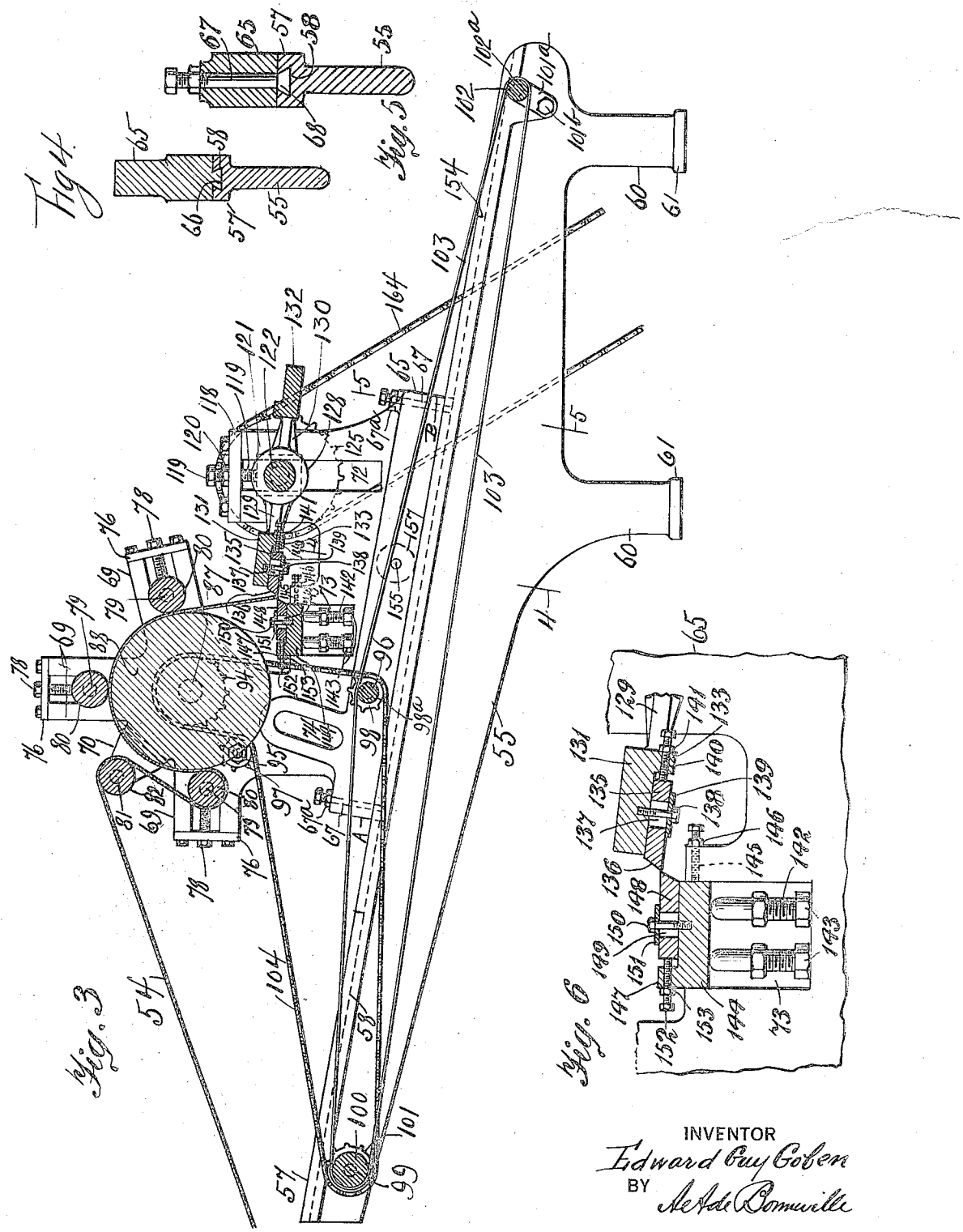

UNITED STATES PATENT OFFICE.

EDWARD GUY GOBEN, OF NEW ORLEANS, LOUISIANA, ASSIGNOR TO THE E. V. BENJAMIN COMPANY, INC., OF NEW ORLEANS, LOUISIANA, A CORPORATION OF LOUISIANA.

CUTTING-MACHINE FOR CLOTH AND OTHER MATERIAL.

1,380,710.   Specification of Letters Patent.   Patented June 7, 1921.

Application filed December 8, 1919. Serial No. 343,391.

*To all whom it may concern:*

Be it known that I, EDWARD GUY GOBEN, citizen of the United States, and resident of New Orleans, in the parish of Orleans and State of Louisiana, have invented certain new and useful Improvements in Cutting-Machines for Cloth and other Material, of which the following is a specification.

This invention relates to a cutting machine for cloth or other material. Its object is the production of a machine which will cut a long sheet of cloth or the like into a plurality of short lengths. The pieces of material cut off are of uniform length and the lengths can be varied by the appurtenances of the machine.

In the accompanying drawings Figure 1 shows a side elevation of a cloth cutting machine exemplifying the invention with a fragmentary portion of a printing press; Fig. 2 is a top plan view of Fig. 1 with portions thereof broken away; Fig. 3 represents a partial enlarged section of Fig. 2 on the line 3, 3; Fig. 4 shows a section of Fig. 3 on the line 4, 4; Fig. 5 shows an enlarged section of Fig. 3 on the line 5, 5 and Fig. 6 shows an enlarged fragmentary portion of Fig. 3.

A frame at the charging end of the machine is indicated with the channel iron columns 20 and the two circular columns 21. The upper ends of the latter are contracted as indicated at 22. A pair of channel irons 23 connect the upper ends of the columns 20 and 21, and angle irons 24 and 25 also connect the said columns. A pair of angle irons 26 connect the channels 23. A pair of angle irons 27 connect the angle irons 24. Pairs of angle irons 28 and 29 connect the angle irons 25. Journal bearings 30 are fastened to the angle irons 24. A shaft 31 is journaled in the bearings 30 and has fastened thereto the guide roller 32. Journal bearings 33 are fastened to the angle irons 25. A shaft 34 is journaled in the bearings 33 and has fastened thereto the guide roller 35. Journal bearings 36 are fastened to the channel irons 23. A shaft 37 is journaled in the bearings 36 and has fastened thereto the guide roller 38. A U-shaped trough with walls 40 and 41 is secured to the angle irons 26, 27, 28 and 29.

The trough is open at the sides as indicated at 42 and the outer wall 41 is extended at its outlet end as indicated at 43. In the top ends of the columns 20 are formed guides 44 for the adjustable cross heads 45. Caps 46 are secured to the top ends of the columns 20, and have in threaded engagement the screws 47 that bear upon the cross heads 45. The said screws are locked in place by means of the lock nuts 48. Each of the cross heads 45 has journaled therein the shaft 49 and the latter has attached thereto the upper feed roller 50.

A shaft bracket 51 with a plurality of pairs of bearings 52 is located adjacent to the columns 20. A shaft 53 which has wound thereon a long sheet of cloth 54, can be supported on the various pairs of bearings 52.

A pair of similar supporting beams 55 are each shown with the inclined upper flange 57 which latter has formed therein the dovetailed guide slot 58. Legs 60 having the feet 61 are formed with each supporting beam 55. The upper end of each of the beams 55 connects with one of the columns 21 and the feet 61 are supported upon the frame 63 of a rotary printing press having the cylinder 64.

The cutting devices and their appurtenances of the machine comprise the housings 65 each with the front end A and the rear end B. Each housing has formed on its under side the dovetailed projection 66 that registers with the guide slot 58. At each end of each housing 66 is formed an opening for a clamping bolt 67 with the dovetailed head 68. Lock nuts 67ª clamp the bolts 67 in place. Each of the housings has formed therewith the radially projecting pairs of guides 69 and the guideslots 72 and 73. Journal brackets 70 are carried on the housings. A guide slot 74 is also formed in one of the housings 65. The guides 69 are each provided with a cap plate 76. A cross head 77 is guided in each accompanying pair of guides 69. A screw 78 is in threaded engagement with each cap plate 76 and bears upon the top face of its accompanying cross head 77. A shaft 79 is journaled in each accompanying pair of cross heads 77 and a guide and pressing roller 80 is fastened to each shaft 79. A shaft 81 is journaled in the brackets 70 and has fastened thereto the guide roller 82. A shaft 83 by means of the nut 84 is adjustably secured in the slot 74. A spur gear 85 has formed therewith the sprocket chain wheel 86 and both said gear 85 and wheel 86 are journaled on the shaft 83. A drum shaft 87 is journaled in the housings 65 and has fastened thereto the driving drum 88. A spur gear 89 is fastened to the shaft 87 and meshes with the spur gear 85, and thereby rotation is transmitted from the spur gear 85 to the spur gear 89. A sprocket chain wheel 94 is fastened to the drum shaft 87. A shaft 95 extends from one of the housings 65 adjacent to the shaft 87 and a shaft 96 is journaled in the lower portions of the housings 65. A sprocket chain wheel 97 is journaled on the shaft 95 and a sprocket chain wheel 98 and a roller 98ª are fastened to the shaft 96. A roller shaft 99 is journaled in the supporting beams 55 and has fastened thereto the roller 100 and the sprocket chain wheel 101. A pair of arms 101ª are adjustably secured to the beams 55 by means of the bolts 101ᵇ. A roller shaft 102 which has fastened thereto the roller 102ª is journaled in the arms 101ª. Endless conveyer bands 103 extend around the rollers 100 and 102ª and over the roller 98ª. A sprocket chain 104 extends around the chain wheel 101 under the sprocket chain wheel 97, over the sprocket chain wheel 94 and under the sprocket chain wheel 98. The chain 104 transmits rotation from the drum shaft 87 to the roller shaft 99. A shaft 105 is journaled in the upper portion of each of the columns 20 and has fastened thereto the feed roller 106. On the shaft 105 is fastened a sprocket chain wheel 107 and on the roller shaft 99 is journaled a sprocket chain wheel 108 having formed therewith one member 109 of a clutch. A second member 110 of the clutch is supported on the shaft 99. A spline 111 of the usual construction is interposed between the shaft 99 and the member 110. A bracket 113 extends from one of the supporting frames 55 and has pivoted thereon the operating handle 113ª with the forked end 114 which engages the groove 115 of the clutch member 110. A sprocket chain 116 connects the sprocket chain wheels 107 and 108. The rotations of the shaft 99 are transmitted to the shaft 105 through the chain 116 and the clutch just described. The wheel 107 is slightly smaller in diameter than the wheel 108, and therefore the wheel 107 rotates somewhat faster than the wheel 108.

The rotations of the sprocket chain wheel 107 are controlled by the operator by means of the operating handle 113ª.

The guide slots 72 are provided with the cap plates 118 which are threaded for the screws 119. The latter are adjustably clamped in place by means of lock nuts 120. Cross heads 121 are secured to the screws 119. By means of the screws 119 and lock nuts 120 the cross heads 121 can be vertically adjusted to different levels in the guide slots 72. A knife shaft 122 is journaled in the cross-heads 121. A balance wheel 124 and the sprocket chain wheels 125 and 126 are fastened to the said knife shaft 122. A sprocket chain 127 connects the sprocket chain wheels 86 and 126 and by this means rotation is transmitted from the shaft 122 to the shaft 83. A rotary knife holder is shown to comprise a plurality of hubs 128 from which extend the diametrically opposite arms 129 and 130. A knife supporting plate 131 extends from the arms 129 and a knife supporting plate 132 extends from the arms 130. A lug 133 extends from one of the faces of the supporting plate 131. A knife blade 135 having the chamfered cutting face 136 and elongated openings 137 is clamped to the plate 131 by means of the screws 138, which extend through the said openings 137.

Washers 139 are interposed between the heads of the screws 138 and the knife blade 135. Adjusting screws 140 with the lock nuts 141 are in threaded engagement with the lug 133 and bear against the knife blade 135.

Supporting bolts 142 are in adjustable threaded engagement with the housings 65 in the slots 73. Lock nuts 143 clamp the bolts 142 in place. A stationary knife holder 144 is supported on the bolts 142. Adjusting screws 145 extend through the housings 65 and bear against the knife holder 144. Lock nuts 146 clamp the screws 145 in place. A lug 147 extends from the holder 144. A stationary knife blade 148 having the elongated openings 149 is supported upon the holder 144. Screws 150 extend through the openings 149 and are in threaded engagement with the stationary holder 144. Washers 151 are interposed between the heads of the screws 150 and the stationary knife blade 148. Adjusting screws 152 extend through the lug 147 against the knife blade 148. Lock nuts 153 hold the screws 152 in place. With each of the supporting beams 55 is formed a rack 154, and in the housings 65 is journaled a shaft 155 with an adjusting wheel 156. Pinions 157 fastened to the shaft 155 mesh with their accompanying racks 154.

The cylinder 64 of the press is fastened to the shaft 159 which latter is journaled in the frame 63. A journal bearing 160 on the frame 63 supports a shaft 161. A sprocket chain wheel 162 and the spur gear 163 are fastened to the shaft 161. A sprocket chain 164 connects the chain wheels 125 and 162. A spur gear 165 is fastened to the shaft 159 and meshes with the spur gear 163. A driving pulley 170 is fastened to the shaft 159. The gear 165 turns the gear 163. The rotations of the gear 163 through the sprocket chain wheels 125 and 162 and chain 164 turns the shaft 122.

The press cylinder 64 is provided with one or two depressions 173, in which is located a clamping shaft 174 with gripping fingers 175 of usual construction.

The operate the machine the cutting devices with their appurtenances are located in a predetermined position upon the supporting beams 55, depending upon the predetermined length into which the material to be operated upon is to be cut. The said predetermined length governs the distance between the rear end B of the housings 66 and the ends of the supporting beams 55, that are adjacent to the press cylinder 64. The said distance being approximately equal to the length of the cut pieces of cloth or other material operated upon. To locate the housings 66 in proper operative position, the clamping bolts 67 are loosened and by means of the adjusting wheel 156, the said housings 66 are moved to the position required, after which the housings are tightly clamped in place by means of the clamping bolts 67.

The pulley 170 of the press cylinder 64 is turned by means not shown. The spur gear 163 is turned by the spur gear 165. The rotations of the shaft 161 are transmitted to the knife shaft 122 and thereby the knife blade 135 is revolved and coacts with the stationary knife blade 148 to cut the material operated upon. The rotations of the shaft 122 are transmitted to the shaft 83, and from the latter rotation is transmitted to the drum shaft 87, whereby the driving drum 88 is turned. The rotations of the drum shaft 87 are transmitted to the shafts 96 and 99 whereby the conveyer bands 103 are moved. The bands carry the cut pieces of material to the gripping fingers 175 of the press cylinder 64. The pieces of cloth are carried by said cylinder to a folding device, which will be described in another application. The rotations of the shaft 99 are transmitted to the shaft 105 through the clutch members 109 and 110 and thereby the sheet of material 54 is unwound from the roll on the shaft 53 and delivered into the trough having the walls 40 and 41. During the charging of said trough it is at the same time pulled therefrom by means of the tension subjected to said cloth while it passes between the driving drum 89 and the guide and pressing rollers 80. From the drum 89 the cloth is delivered to the knife blades 135 and 148 when it is severed. The quantity of cloth delivered to the trough and cut into lengths depends upon the speed at which the machine is driven and the diameters of the sprocket chain wheels 107, 101 and 94 are such that the cloth is delivered to the trough at a somewhat greater speed than the speed at which it is pulled therefrom, by virtue of which undue strains and pulls on the material operated upon are prevented during its movements to the driving drum 89. The fabric is kept loose in the U shaped trough, and the banking of the material or cloth therein has the advantage of allowing the press to run on while a fresh roll of fabric is located with its shaft 53 in the bearings 52. The cloth banked up in the trough tides over the time necessary to attach the end of exhausted roll of cloth to that of the fresh roll which is next put in operation. If too great an accumulation of cloth or other material operated upon collects in the trough, the operator disengages the clutch members 109 and 110 for a short period of time and thereby stops the rotations of the shaft 105. By this means the sheet 54 is stopped from unwinding the material from the roll on the shaft 53.

The sheet of material as it unwinds from the shaft 53 passes between the feed rollers 50 and 106, from thence into and through the trough and then over the guide roller 32. The sheet then passes under the guide roller 35 and from the latter over guide rollers 38 and 82. The material next passes between the guide and pressing rollers 80 and the driving drum 88. The rollers 80 are located adjacent to the crown and sides of the driving drum 88 and thereby the sheet of material 54 is forced into contact with said drum.

By means of the arms 101$^a$ the tension of the conveyer bands 103 can be adjusted. The roller 98$^a$ being fastened to the shaft 96, the said roller 98$^a$ is located in various positions with different positions of the housings 65 and supports the conveyer bands in about their middle portions.

Having described my invention what I desire to secure by Letters Patent and claim is:—

1. In a cutting machine the combination of supporting beams each with a dove-tail guide slot in the upper face thereof, a pair of housings each with a dove-tail projection supported upon said beams, the said projections registering with said guide slots, cutting devices carried by said housings, and bolts with dovetail shaped heads extending through said housings and the heads thereof engaging said dovetail guide slots.

2. In combination a cutting machine, supporting beams for the cutting machine, housings adjustably supported on the beams, a driving drum journaled in the housings to carry a sheet of material to be cut, guide and pressing rollers journaled in the housings with their surfaces adjacent to the surface of the driving drum to secure the sheet of material operated upon upon the surface of said drum, a normally stationary knife blade adjustably supported in the housings, a revolving adjustable knife blade in the housings coacting with the stationary knife blade, conveyer bands under the driving drum and knife blade and means to move the said bands in unison with the rotation of the driving drum and the rotation of the knife blade.

3. In a cutting machine the combination of supporting beams, housings supported on the beams, a driving drum to support a sheet of material to be operated upon journaled in the housings, means to maintain the sheet against the drum at its crown and sides during its rotation, cutting devices in the housings, moving conveyer bands under the drum and cutting devices and means to adjust the tension of the conveyer band.

4. In a cutting machine the combination of supporting beams, housings adjustably supported on the beams, a driving shaft journaled in the housings, a drum to support a sheet of material to be operated upon fastened to the driving shaft, means to maintain said sheet against the drum during its rotation, cutting devices in the housings, conveyer bands under the drum and under the cutting devices, a shaft journaled in the supporting beams at one end thereof, a roller fastened to said shaft to support one end of the conveyer bands, arms adjustably secured to the beams at the other end thereof, a roller journaled in said arms to support the other end of the conveyer bands, a rotating roller journaled in the housings to support the conveyer bands at about their central portions, a sprocket chain wheel fastened to the shaft journaled at one end of the supporting beams, a sprocket chain wheel fastened to the driving shaft of the driving drum, a sprocket chain connecting the two chain wheels to maintain the movements of the conveyer bands and the rotation of the driving drum in unison.

5. In combination, a cutting machine, supporting beams for the machine, housings adjustably supported on the beams, a drum shaft journaled in the housings, a sprocket chain wheel fastened to the shaft, a driving drum fastened to the shaft to carry a sheet of material to be cut, guide and pressing rollers journaled in the housings with their surfaces adjacent to the crown and sides of the surface of the driving drum to secure the sheet of material in contact with the drum, a normally stationary knife blade adjustably supported in the housings, a revolving adjustable knife blade in the housings, coacting with the stationary knife blade, a roller shaft journaled near one end of the supporting beams, a second roller shaft adjustably journaled adjacent to the other end of the supporting beams, a roller journaled on the second shaft, a shaft extending from one of the housings, a sprocket chain wheel journaled on the latter shaft, a shaft journaled in the lower portions of the housings, a roller and a sprocket chain wheel fastened to the latter shaft, a plurality of conveyer bands bearing on the latter roller and extending around the rollers of the supporting beams, a sprocket chain in contact with the sprocket chain wheel fastened to the drum shaft, the two sprocket chain wheels of the housings and the sprocket chain wheel of the supporting beams, to move the conveyer bands in unison with the rotations of the driving drum.

Signed at New Orleans, in the parish of Orleans and State of Louisiana, this 1st day of December, A. D. 1919.

EDWARD GUY GOBEN.